United States Patent [19]
Joseph

[11] 4,111,526
[45] Sep. 5, 1978

[54] ROTATIONALLY INDEPENDENT OPTICAL CORRELATION FOR POSITION DETERMINATION

[75] Inventor: Bernard W. Joseph, Berkley, Mich.

[73] Assignee: General Motors Corporation, Detroit, Mich.

[21] Appl. No.: 796,124

[22] Filed: May 12, 1977

[51] Int. Cl.² ............... G01B 11/26; G03H 1/16; G06G 9/00
[52] U.S. Cl. ........................ 350/162 SF; 350/3.83; 356/172
[58] Field of Search ............. 350/162 SF, 3.5, 3.83; 356/71, 172

[56] References Cited

U.S. PATENT DOCUMENTS

| 3,483,513 | 12/1969 | Burckhardt et al. | 350/3.5 |
| 3,539,260 | 11/1970 | Burch | 356/172 |
| 3,612,698 | 10/1971 | Mathisen | 350/162 SF |
| 3,636,330 | 1/1972 | Holeman et al. | 350/162 SF |

Primary Examiner—Ronald J. Stern
Attorney, Agent, or Firm—Warren D. Hill

[57] ABSTRACT

Coherent optical correlation is applied to an article having circular features as well as noncircular features. A spatial filter is constructed for a typical part with the noncircular features masked out. The filter is placed in the transform plane of the optical correlation system so that the system will produce correlation signals indicating the presence, the coordinate position and angular orientation of the part within the field of view of the system.

3 Claims, 13 Drawing Figures

PRIOR ART

ROTATIONALLY INDEPENDENT OPTICAL CORRELATION FOR POSITION DETERMINATION

This invention relates to the method of coherent optical correlation and particularly to such a method which determines the angular orientation and coordinate position of a part.

It has been proposed previously to use coherent optical methods to recognize or identify objects or light patterns as well as to determine the position of a recognized object relative to some particular frame of reference. Such previous proposals have the drawback that the object of interest in order to be detected by the system must be at some predetermined angular orientation or an angular search must be performed by mechanically rotating the object or optically rotating the image of the object or the Fourier transform of the object. These limitations occur for objects having rotationally unsymmetric features. It is desired, however, to determine the angular orientation and coordinate position of objects which have circular features as well as rotationally unsymmetrical features and moreover it is desired to dispense with the moving parts which characterize an angular searching apparatus.

It is therefore a general object of this invention to provide a coherent optical correlation system for recognizing and determining the location of an object having both circular and noncircular features without making an angular search.

An optical correlator may be considered simply as an optical device that transforms an input image of an object into a suitable light pattern which may, when compared to a predetermined pattern (spatial filter) be analyzed for object and object position identification. Technical details and a mathematical explanation of how this is accomplished appear in the text J. W. Goodman "Introduction to Fourier Optics", McGraw Hill (1968). Briefly, a spherical imaging lens has the ability to transform an object image into a light pattern which is the Fourier transform of the object image. The expression "Fourier Transform" is not used with mathematical precision herein; rather it is recognized that a finite lens has some practical limitations but can nonetheless produce a very good Fourier transform of an image. If an object image is located in an input plane one focal length from one side of a transform lens, a light pattern is projected into a transform plane spaced one focal length from the other side of the lens. The light pattern is essentially a Fourier transform of the object image and each feature of the light pattern arises from some corresponding feature of specific shape, dimension and position in the object image. By placing a suitable spatial filter in the transform plane portions of the light pattern corresponding to selected image features are filtered from the light beam which is then optically analyzed by another transform lens to obtain a correlation pattern or spot in an output plane.

The resulting correlation spot, is the optical signal which indicates recognition of an object, and its position in the output plane is related to the position of the object image in the input plane. Ordinarily, the object image under examination must be accurately positioned at a given angle for a correlation spot to be produced.

The present invention is carried out by preparing a spatial filter representing only the circular features of the object with the rotationally nonsymmetrical features removed and using that spatial filter in the transform plane of a coherent optical correlation system to obtain correlation spots indicative of the angular orientation as well as the coordinate position of the object image.

The above and other advantages will be made more apparent from the following specification taken in conjunction with the accompanying drawings wherein like reference numerals refer to like parts and wherein.

Figure 1:
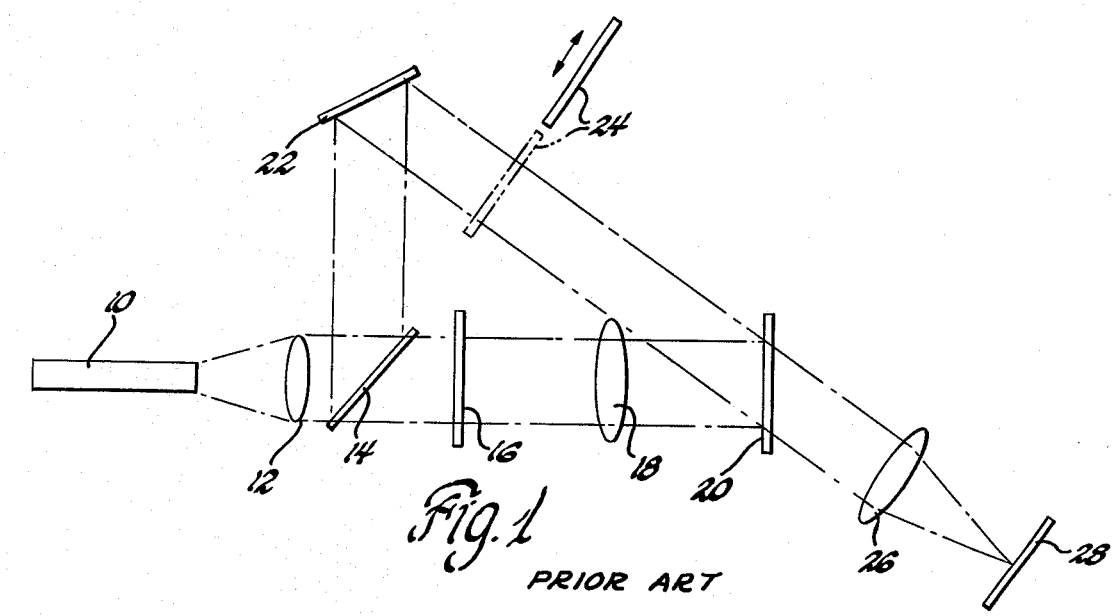
FIG. 1 is a schematic diagram of an optical system for recording spatial filters and performing coherent optical correlation methods.

FIG. 1 illustrates a well known form of coherent optical correlation system including a laser 10 as a source of coherent light, and a collimating lens 12 for collimating the light beam. A beam splitter 14 passes a portion of the light beam through a photographic transparency 16 bearing an object image which is located in the input plane or front focal plane of a spherical imaging lens or transform lens 18. The back focal plane or transform plane of the lens 18 contains a photographic plate 20. A mirror 22 receives collimated coherent light emitted laterally from the beam splitter 14 and reflects it onto the photographic plate 20, thus providing the reference beam during hologram construction. A movable stop 24 selectively blocks the path of the reference beam. During construction of a hologram to be used as a spatial filter, a desired object image on transparency 16 is transformed by the lens 18 and the resulting Fourier transform is focused onto the photographic plate 20 and simultaneously, the reference beam reflected by mirror 22 impinges on the plate 20 to expose the hologram. The photographic plate is then photographically developed and replaced in its original position in the transform plane to serve as a spatial filter. The actual reference beam reflected from the mirror 22 is used for no purpose other than the construction of the hologram 20 and accordingly after the hologram is exposed, the movable stop 24 is positioned in front of the mirror 22 to block passage of the reference beam to the spatial filter.

With the same or similar object image in the transparency 16, the Fourier transform thereof is projected onto the spatial filter 20. As is well known, when a hologram is illuminated by the object beam used in construction, it reconstructs the collimated reference beam. A second spherical lens 26 in the path of the reconstructed reference beam focuses that beam to a spot of light (correlation spot) on a screen 28 in an output plane spaced one focal length away from the lens 26. When the object image in the input plane is in the same location as the object image used for construction of the spatial filter, then the reference beam is emitted from the spatial filter 20 in the same direction as the original reference beam and its focal spot on the output plane is then taken as the origin of the output reference system.

A displacement of the image in the input plane results in an inverted displacement in the output plane. Thus any shift in the object image of the input plane is directly reflected in the opposite displacement of the correlation spot in the output plane relative to the origin of the reference system.

Figure 2:
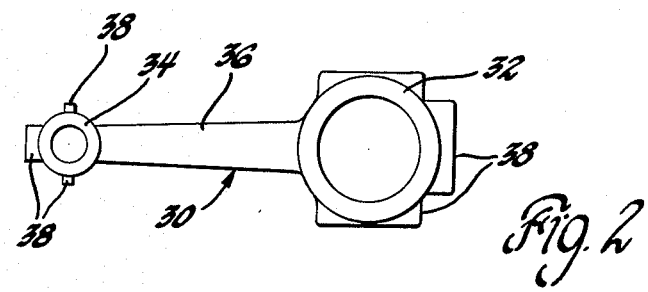
FIG. 2 is a plan view of an object upon which optical correlation is to be performed.
Figure 3:
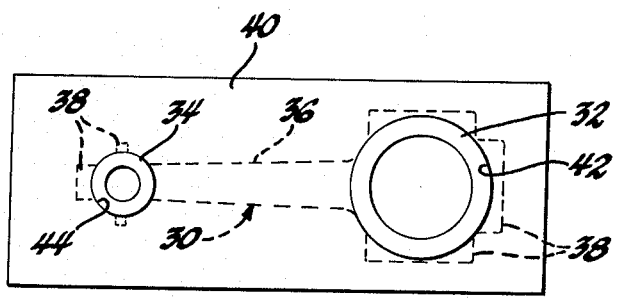
FIG. 3 is an illustration of a mask partially covering the object of FIG. 2.

FIG 2 is a plan view of a connecting rod casting which exemplifies an object having features of both symmetric and nonsymmetric types. The two ends of the rod 30 have large and small substantially circular portions 32 and 34, respectively, which comprise the rotationally symmetric features. An elongated connecting portion 36 extends between the two circular portions and a number of ears or lugs 38 project from the circular portions. Thus the connecting rod includes portions 36 and 38 which are not rotationally symmetric. To facilitate correlation of the connecting rod with a spatial filter irrespective of the angular position of the connecting rod image in the input plane 16, a filter is prepared which corresponds to only the circular portions of the connecting rod casting 30. One method of preparing such a spatial filter is by masking the casting 30, as shown in FIG. 3, with a mask 40 covering all rotationally nonsymmetric portions 36, 38 and exposing the substantially circular portions 32, 34. The mask 40 is of black material, for example, black velvet cloth with circular apertures 42, 44 cut therein for matching alignment with the circular portions 32 and 34, respectively. Then a photographic transparency is prepared from the masked casting, the transparency is placed in the input plane of the optical system of FIG. 1 and a holographic spatial filter is prepared as described above.

Another method of preparing an equivalent spatial filter is by simply drawing circles corresponding in size and spacing to the circular portions 32 and 34 of the casting and preparing the phototransparency from that drawing. Still another way of preparing spatial filters corresponding to the circular portions of the casting is to mathematically compose a hologram by use of an electronic computer. This technique will not be explained here since it forms no part of this invention and the use of computers to prepare holograms for simple objects has long been practiced.

Figure 4A:
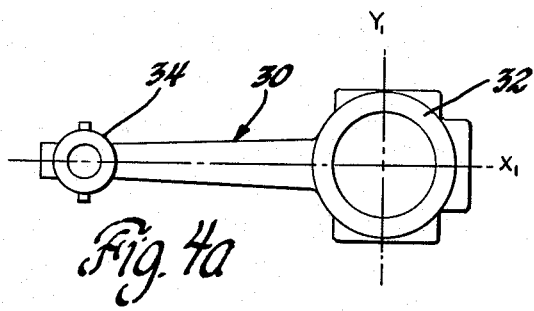
FIGS. 4a, 4b, 5a, 5b, 6a and 6b are illustrations of several object input position and the optical correlation spot outputs corresponding to each object input position.
Figure 4B:
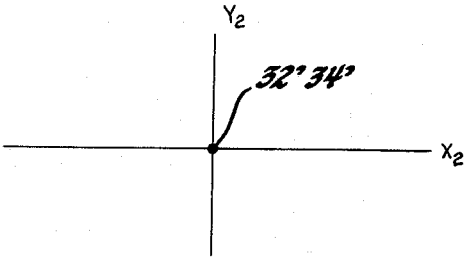
Figure 5A:
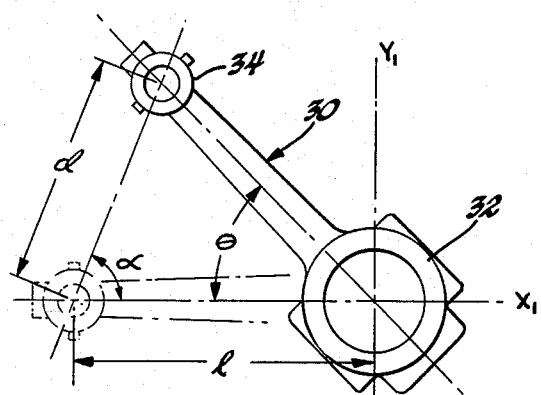
Figure 5B:
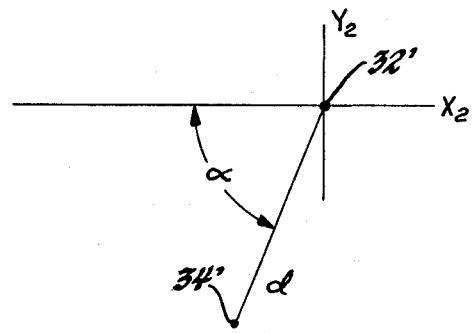

FIGS. 4a, 4b, 5a, 5b, 6a and 6b are illustrative examples of the correlation output signal for various positions of an input image. FIG 4a shows the casting 30 with its large circular end 32 centered at the origin of a reference plane $X_1, Y_1$ and the small end 34 lying along the $X_1$ axis to the left of the origin. The position of the reference system is arbitrary. With the image of the object located in the position of the input plane corresponding to the object position when the spatial filter was constructed, the output correlation spot 32',34' occurs at a position in the output plane which is considered as the origin of the output plane reference system $X_2, Y_2$. Either of the circular portions 32 or 34 is sufficient to produce a correlation spot in the output plane. In the case of FIG. 4, however, the correlation spots 32',34' are superimposed. If as shown in FIG. 5a the object is rotated through an angle $\theta$ of 45° so that the part 34 moves but the large portion 32 remains centered at the origin of the $X_1, Y_1$ plane, two correlation spots 32',34' appear in the output plane as shown in FIG. 5b. The spot 32' remains at the $X_2, Y_2$ origin but the spot 34' is displaced from the origin by an amount proportional to the displacement of the portion 34 in the input plane and in the opposite direction. Since as stated above, the displacement of an object in the input plane is reflected by an inverted displacement in the output plane, the interrelation of the correlation spots 32',34' with the object position is evident.

As shown in the FIG. 5a, the portion 34 has been displaced through a distance $d$ at an angle $\alpha$ from line $X_1$. It can be shown that $$\tan \alpha = \sin \theta / (1 - \cos \theta), \text{ and}$$

$$d = 2l \sin(\theta/2)$$

where $d$ is the distance between the centers of the circular portions 32 and 34.

Figure 6A:
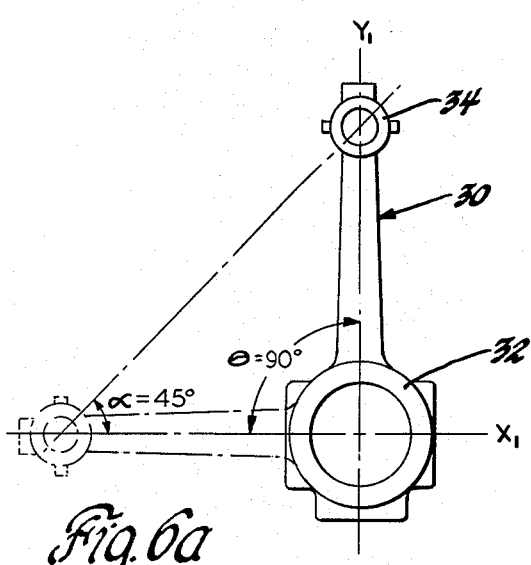
Figure 6B:
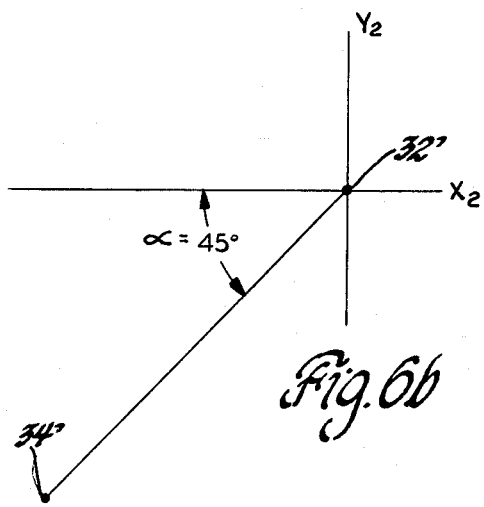

When $\theta = 45°$, $\alpha = 67.5°$ and $d = 2l(0.38)$. As shown in FIG. 6a, the casting 30 has been rotated through an angle of $\theta = 90°$ relative to FIG. 4a such that, as shown in FIG. 6b, the angle $\alpha = 45°$ and the distance $d = 2l(0.7)$. Thus by monitoring the position of the correlation spots 32' and 34' in the output plane, the position of and the angular orientation of the casting 30 in the input plane is readily determined. Of course, if both ends of the casting 30 are displaced in the input plane, then both correlation spots will be displaced in the output plane. The larger circular portions 32 will transmit more light flux through the system than will smaller portion 34 so that its corresponding correlation spot 32' will be larger or more intense than the spot 34', thus enabling a distinction between the correlation spots in the output plane.

Figure 7:
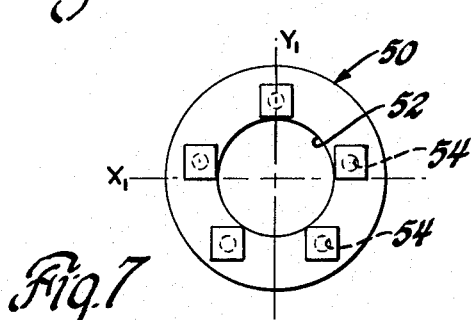
FIGS. 7 and 8 are illustrations of a wheel used as an object for optical correlation and masking techniques for synthesizing spatial filters.
Figure 8:
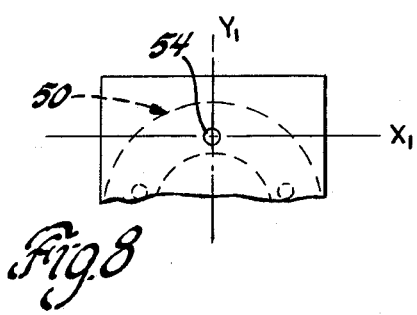

Another method of synthesizing a spatial filter for the casting 30 would be to use a double exposure technique to first expose a hologram of the transform of the parts circular portion 32 while centered on the $X_1, Y_1$ axis and then shift the part to place the circular portion 34 at the origin of the $X_1, Y_1$ axis and make a second exposure for that portion. Then the resulting spatial filter will cause a slightly different correlation spot output. The two spots 32',34' then can never be superimposed because at least one of the portions 32 or 34 has to be spaced from the origin when the object image is being viewed. The position of the correlation spots relative to the origin of the reference plane $X_2, Y_2$ will always have a direct but inverted correspondence to the distance of the portions 32 and 34 from the origin of the input reference plan $X_1, Y_1$. As is illustrated in FIGS. 7 through 9 where the object is a wheel 50 having a concentric center opening 52 and five spaced holes 54, the filter is made by first exposing the gross circular features of the wheel to the hologram recording system with the wheel centered in a reference plane, $X_1, Y_1$, the holes 54 being masked off. Then as shown in FIG. 8, the outline of one of the holes 54 is exposed to the filter recording system with the hole 54 being centered in the reference plane and all other features of the wheel are masked off, thereby producing a double exposure hologram.

Figure 9A:
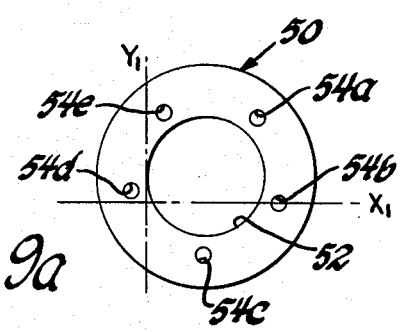
FIGS. 9a and 9b illustrate the relative positions of an object image in a correlation input plane with correlation spots in an output plane.
Figure 9B:
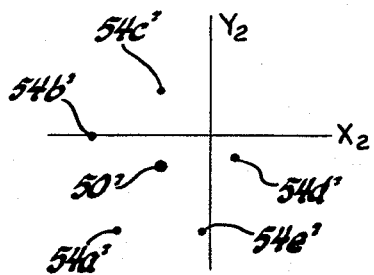

FIGS. 9a and 9b reveal the results of the correlation of the wheel 50 with the filter thus recorded. With an image of a wheel in the input plane, it will be seen that there are six circular features, i.e. the gross wheel 50 and the five holes 54a through 54e with the center of the wheel 50 disposed in the first quadrant of the input plane. Six corresponding correlation spots occur in the input plane $X_2, Y_2$, shown in FIG. 9b; an enlarged correlation spot 50' in the third quadrant of the output plane corresponds to the center of the wheel 50 surrounded by five smaller spots each corresponding to one of the holes 54.

As will be apparent to those skilled in the art, the practical application of the subject invention is not limited to an input object imaged in the form of a photographic transparency or an optical correlation signal output displayed on a screen for visual examination. It has already been proposed to perform coherent optical correlation by using a real time optical data processing device which can convert an image formed in noncoherent light to a coherent light beam as described by Alex Jacobson et al "A Real-Time Optical Data Processing Device", Information Display, Vol. 12 no. 1, September 1975, pp. 17-22. Thus correlation spots may be displayed as fast as parts appropriate to a filter are brought invo view of the optical correlation system. As is well known, the electronic recording of the correlation spot positions and amplitudes are readily made by some type of television camera such as a solid-state array camera which converts the light pattern into a serial train of electronic signals for electronic processing and calculation.

It is seen then that the improved optical correlation method according to this invention allows recognition and determination of angular orientation and coordinate position of parts provided the parts have both rotationally symmetric and nonsymmetric aspects and accomplishes that purpose without the expense or the time consuming action of rotating optical or mechanical components traditionally required for an angle search.

The embodiments of the invention in which an exclusive property or privilege is claimed are defined as follows:

1. The coherent optical correlation method of determining the angular and positional orientation of an object irrespective of the angular orientation of the object, the object being comprised of circular features and noncircular features, comprising the steps of
    forming a coherent light image of the object,
    optically forming a Fourier transform of the object image in a transform plane,
    synthesizing a spatial filter representing a hologram of the Fourier transform of at least two of the circular features of the object, with the object at a specific reference position and angle,
    filtering the object transform by positioning the spatial filter in the said transform plane thereby producing a resultant light pattern from the interaction of the object transform and the spatial filter,
    and focusing the said resultant pattern to produce a single correlation spot in an output plane when the object is oriented at the reference angle, the position of the correlation spot in the output plane being related to the position of the object, and to produce at least two spaced correlation spots in the output plane when the object is angularly displaced from the reference angle, the spacing and relative angular relationship of the correlation spots being indicative of the angular orientation of the object.

2. The coherent optical correlation method of determining the angular and positional orientation of an object irrespective of the angular orientation of the object, the object being comprised of circular features of substantially different sizes and noncircular features, comprising the steps of
    forming a coherent light image of the object,
    optically forming a Fourier transform of the object image in a transform plane,
    synthesizing a spatial filter representing a hologram of the Fourier transform of at least two different sized circular features of the object, with the object at a specific reference position and angle,
    filtering the object transform by positioning the spatial filter in the said transform plane thereby producing a resultant light pattern from the interaction of the object transform and the spatial filter,
    and optically forming a Fourier transform of the said resultant pattern to produce a single correlation spot in an output plane when the object is oriented at the reference angle, the position of the correlation spot in the output plane being related to the position of the object, and to produce in the output plane at least two spaced correlation spots of different intensities according to the size of the corresponding circular feature on the object, and when the object is angularly displaced from the reference angle, the position and angle of a less intense correlation spot relative to a more intense spot being indicative of the angular orientation of the object.

3. The coherent optical correlation method of determining the angular and positional orientation of an object irrespective of the angular orientation of the object, the object being comprised of circular features and noncircular features, comprising the steps of
    forming a coherent light image of the object,
    optically forming a Fourier transform of the object image in a transform plane,
    synthesizing a spatial filter representing a hologram of the Fourier transform of at least two of the circular features of the object by covering the noncircular features of the object with an opaque mask exposing only said circular features of the object, optically forming a Fourier transform of the said circular features with the object at a specific reference position and angle, and constructing a hologram of the transform of the said circular features,
    filtering the object transform by positioning the spatial filter in the said transform plane thereby producing a resultant light pattern from the interaction of the object transform and the spatial filter,
    and optically forming a Fourier transform of the said resultant pattern to produce a single correlation spot in an output plane when the object is oriented at the reference angle, the position of the correlation spot in the output plane being related to the position of the object, and to produce at least two spaced correlation spots in the output plane when the object is angularly displaced from the reference angle, the spacing and relative angular relationship of the correlation spots being indicative of the angular orientation of the object.

* * * * *